United States Patent [19]

Dunlap

[11] 4,418,959

[45] Dec. 6, 1983

[54] SCISSOR TAIL DUMP TRAILER APPARATUS

[76] Inventor: James G. Dunlap, 3533 SE. 143rd St., Portland, Oreg. 97236

[21] Appl. No.: 350,547

[22] Filed: Feb. 19, 1982

Related U.S. Application Data

[63] Continuation-in-part of Ser. No. 155,017, May 30, 1980, abandoned.

[51] Int. Cl.³ .................................................. B60P 1/04
[52] U.S. Cl. ............................... 298/19 V; 298/21 V; 298/22 F
[58] Field of Search ................ 298/19 R, 19 V, 21 R, 298/21 V, 22 F; 414/495

[56] References Cited

U.S. PATENT DOCUMENTS

| | | | |
|---|---|---|---|
| 1,606,412 | 11/1926 | Graham | 298/21 V |
| 1,826,973 | 10/1931 | Winner | 298/19 R |
| 1,870,689 | 8/1932 | Remde | 298/19 V |
| 2,467,056 | 4/1949 | Schmidtke | 298/19 R |
| 2,621,964 | 12/1952 | Le Tourneau | 298/19 V |
| 2,732,253 | 1/1956 | Birdwell | 298/21 R |
| 3,237,988 | 3/1966 | Esgate | 298/21 R |
| 3,870,339 | 3/1975 | Goff | 414/495 X |

*Primary Examiner*—Sherman D. Basinger
*Attorney, Agent, or Firm*—Edwin E. Greigg

[57] ABSTRACT

A scissor tail dump trailer in which the tongue is so positioned that the load is carried by the trailer and not the towing vehicle. Also the trailer frame is so constructed that the pivot end of the trailer is supported such that the pivot end of the trailer bed is not lowered below the platform carrying the trailer bed.

8 Claims, 9 Drawing Figures

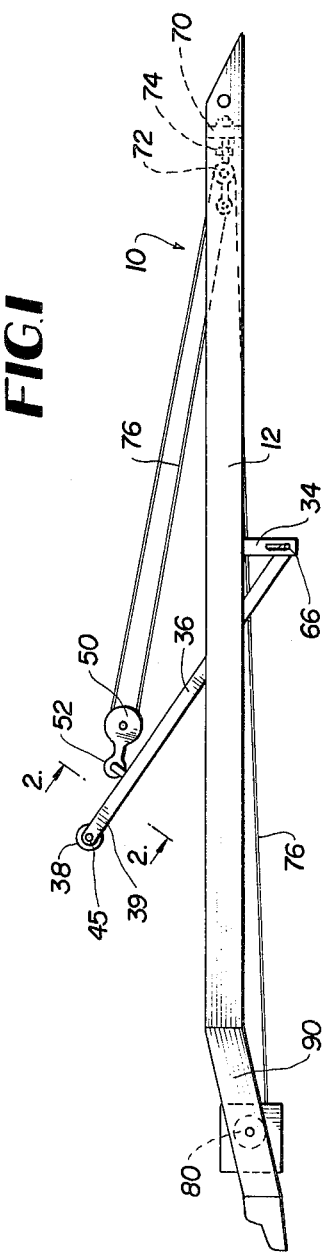
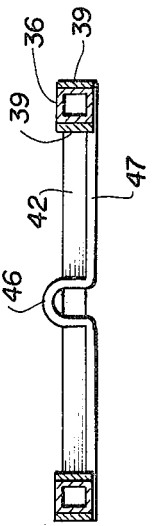
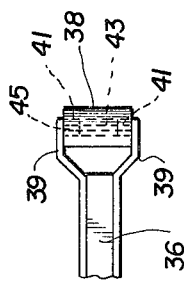
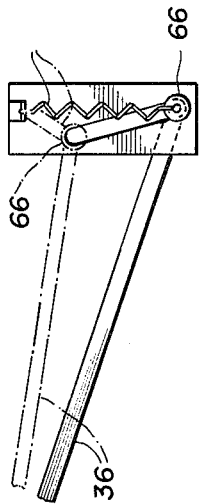
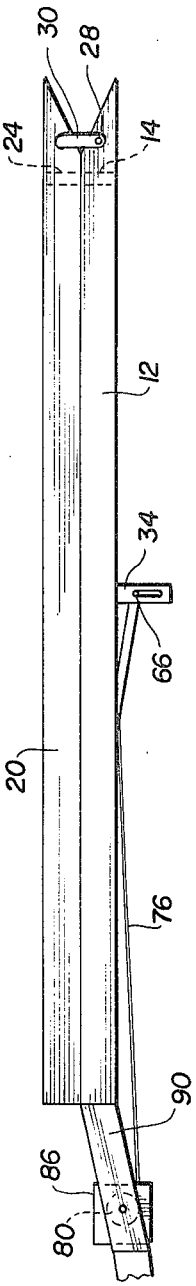

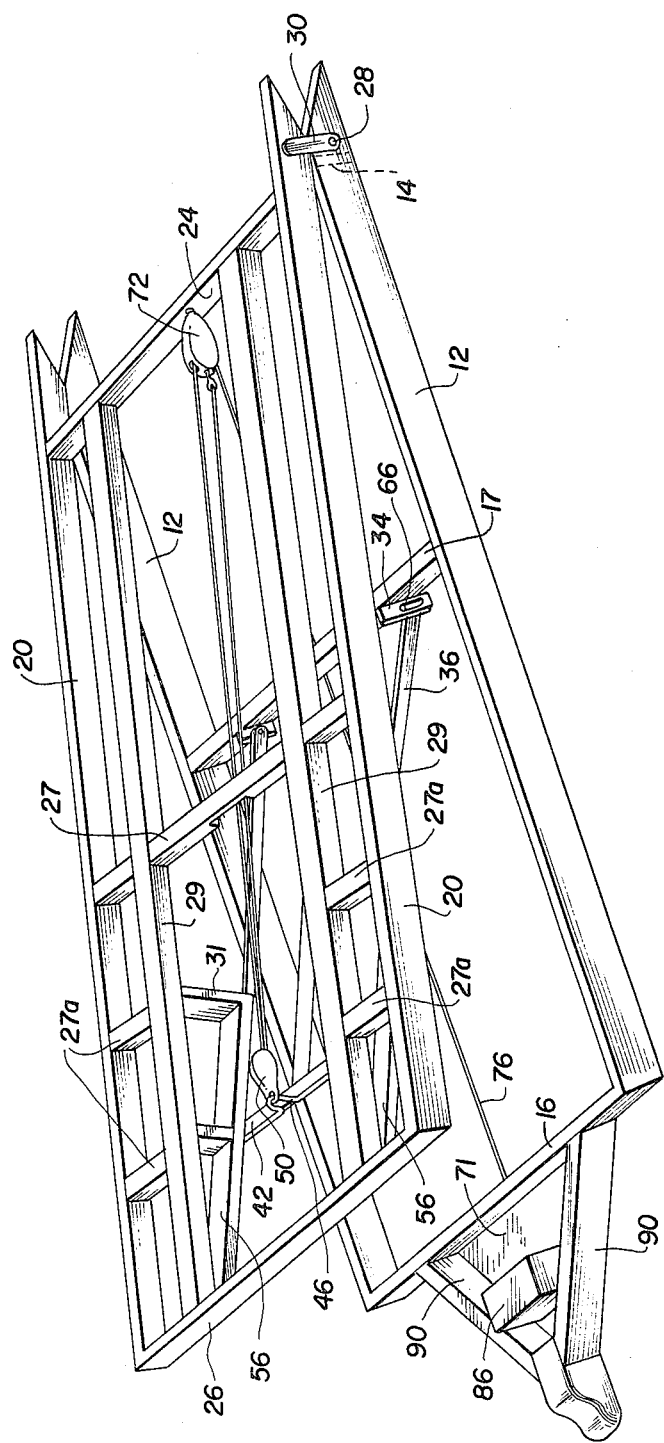

SCISSOR TAIL DUMP TRAILER APPARATUS

CROSS REFERENCE TO RELATED APPLICATION

This application is a continuation-in-part of application Ser. No. 155,017 filed May 30, 1980 now abandoned.

CROSS REFERENCE TO PRIOR ART DISCLOSURES AND REFERENCES

The present invention is a departure and improvement over the known prior art references listed as follows U.S. Pat. Nos.:
1,606,412 Graham
1,826,973 Winner
1,870,689 Remde
2,467,056 Schmidtke
2,621,964 Tourneau
2,732,253 Birdwell
3,237,988 Esgate
3,700,070 King
3,724,696 Leeper
3,802,006 Nelson et al
3,870,339 Goff None of these references are considered more than of general cursory background information.

BRIEF SUMMARY OF THE INVENTION

The present invention relates to an improved scissor tail dump trailer apparatus in which the tongue or trailer hitch is sloped generally downward from the load carrying platform frame so that a winch line will not touch any of the under carriage of the trailer and so that the load will be carried by the trailer rather than being carried by the towing vehicle. The platform frame and dump trailer bed are so assembled that the pivot end of the bed is not lowered below the platform when dumping its load.

More particularly the invention relates to a pair of lifting arms that are sufficiently strong to support heavy loads and are provided with rollers on the pair of lifting arms which are provided with bearings on the inside of the rollers. The bearings are held at each end of the roller with a spacer in-between the bearings. The bearings are held in place and are supported by means of a bolt or other fastening member. The rollers are made of hardened steel tubing and the bearings may be of any type such as the needle roller type.

Also within the purview of the invention is to provide a seat or series of parallel lifting arms made of square or tubular steel with cross-braces welded between the arms for spacing and framing of the lifting arms. A cross arm is provided near the roller end of the lifting arms to which a pulley block is attached.

The pivot end of the arms is supported by a bolt extending through a steel sleeve that passes through a hole in the arm and is welded in place. The bolts and the sleeves may be greased or lubricated by means of a grease zerke fitted in a hole in the sleeve.

The platform frame includes at one end pivot plates which are pivotably fastened to the platform at one end and welded at its opposite end to the dumping bed which is designed to lift the bed approximately one quarter inch when dumping. The rear end of the trailer does not lose clearance between the rear of the dump bed and the street when in a dumping position. This is not true of dump trailers of the prior art. Other dump trailers such as known in the prior art lose all of the clearance between the street and the rear of the dump frame.

BACKGROUND OF THE INVENTION

Analyses of the prior known art have provided unwieldy and unduly heavy structures for transporting objects and for dumping material from tandem trailers and the like but there have been excessively powerful lifting devices that have caused the use of the equipment to be inefficient. Also this has encumbered the time and effort thus involved in loading and unloading as well as damage resulting from dumping operations and are a considerable concern to both the builder, the trucker and the ultimate consumer.

SUMMARY AND FIELD OF THE INVENTION

It is an object and advantage of the present invention to provide a new and improved method of mounting pulley blocks on a platform frame and dumping frame and in which an electric winch winds a cable or rope which is securely anchored and threaded through a double sheave pulley arrangement so that the scissor tail dump trailer apparatus performs efficiently and uniquely according to the present invention.

A further object and advantage of the present invention is to provide a battery and electric winch arrangement for winding rope or cable means so that it is constructed to pass clear of cross members, structurers, mechanical objections and in which the dumping frame or dumping bed is easily elevated and lowered according to operation and control of the electric winch which is driven through a selective switch circuit from a heavy duty 12-volt battery.

A further object of the invention is to provide a unique sloping towing hitch and arms arrangement so that the front end of the platform frame terminates in a trailer hitch unit which is pronouncedly dropped from a height of the platform frame to the trailer hitch and permits the winch to pull on an underside of a winding drum to be sunk between a sloping towing arms while mounted on a heavy base plate so that the rope or cable clears freely an underside of the platform cross members.

It is seen that a further object and advantage of the present invention is to provide a pair or set of rollers mounted on bearings at the upper end of a pair of lifting arms so that the rollers slide or roll with ease in operating or guiding within inverted channel iron members that are disposed in sloping fixed relation beneath a dumping bed that is pivotally articulated with a platform frame according to a preferred embodiment of the present invention.

BRIEF DESCRIPTION OF THE SEVERAL VIEWS OF THE DRAWINGS

The above and other objects and advantages of the invention will become apparent upon full consideration of the following detailed description and accompanying drawings in which:

FIG. 1 is a side elevation view of a platform frame and the lifting arms disposed according to an embodiment of the present invention;

FIG. 2 is a cross sectional view taken along lines 2—2 of FIG. 1 but without showing the hook engaging the anchor eye thereof;

FIG. 2A illustrates a roller on the end of a lifting arm.

FIG. 3 is a cross sectional view similar to FIG. 1 but showing further a dumping bed frame in collapsed position according to an embodiment of the present invention.

FIG. 4A illustrates a spring connected for lifting a support end of a lifting arm into a different position.

FIG. 7 illustrates a perspective view of the platform, bed frame, and lifting means.

DETAILED DESCRIPTION OF THE PREFERRED EMBODIMENT OF THE INVENTION

Figure 4:
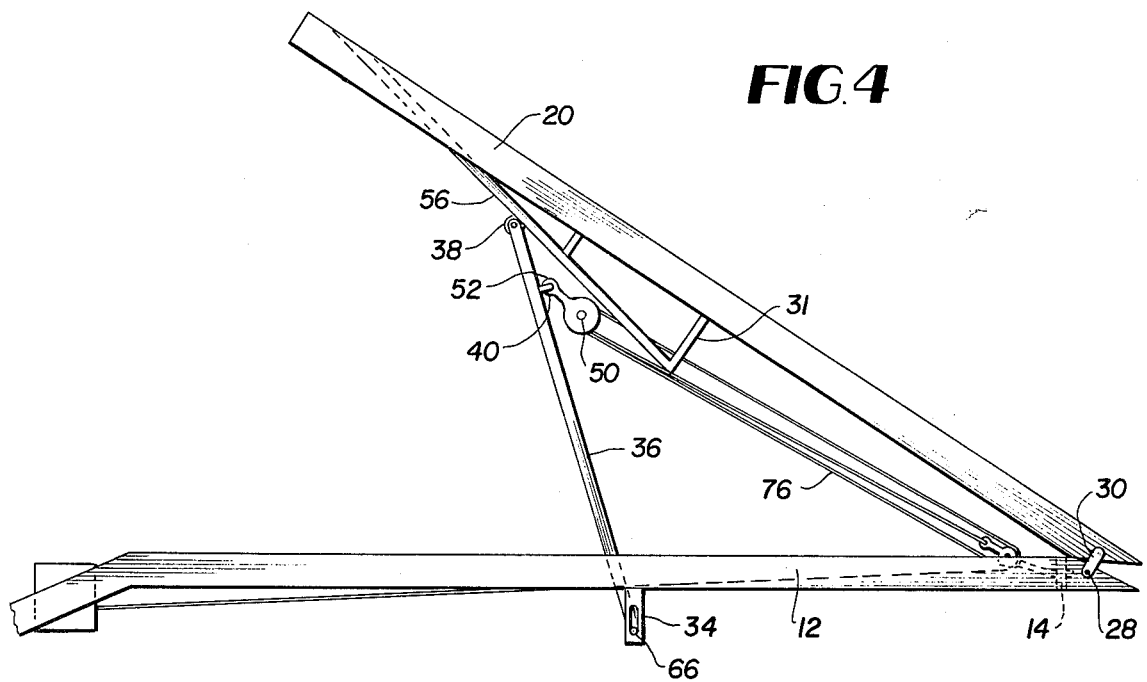
FIG. 4 is a similar view to FIG. 3 but where the dumping bed frame is illustrated in fully elevated position according to the present invention.

Referring now to the drawing there is shown a scissor tail dump trailer apparatus 10, including a platform frame having a generally rectangular configuration as particularly shown in FIG. 7 with sides 12, a rear end portion 14 and a front end portion 16 with at least one cross support or member 17. The sides, ends, and cross supports may be formed of square, rectangular solid or tubular steel and welded together into a unitary structure. The rear end of the platform sides 12 extend beyond the end piece 14 and are sloped downwardly at a 45° angle beginning at the top near the end piece 14.

The bed is formed of the same structural elements as the platform. It is of the same dimensions in length and width as the platform and includes sides 20, a rear end 24 and a front end 26 with a cross support piece or member 27 and linear supporting member 29. The linear supporting members are supported in the front section by short cross pieces 27a. The sides extend beyond the rear end 24 and are sloped upwardly at a 45° angle from a point near the bottom of the end 24. The bed is secured to the platform at its rear end such that the sides and ends overlay the platform with the sloped ends overlaying each other. A piece of steel plate 30 is welded to each of the sides 20 on the outside of and to the rear of end piece 24 and extends downwardly along the outside of sides 12 of the platform. The steel plate is provided with a pivot hole which is off-center with respect to the steel plate. A bolt or pin 28 passes through the hole in the plate and a matching hole in the end of sides 12 of the platform to provide a pivot for the bed.

Figure 5:
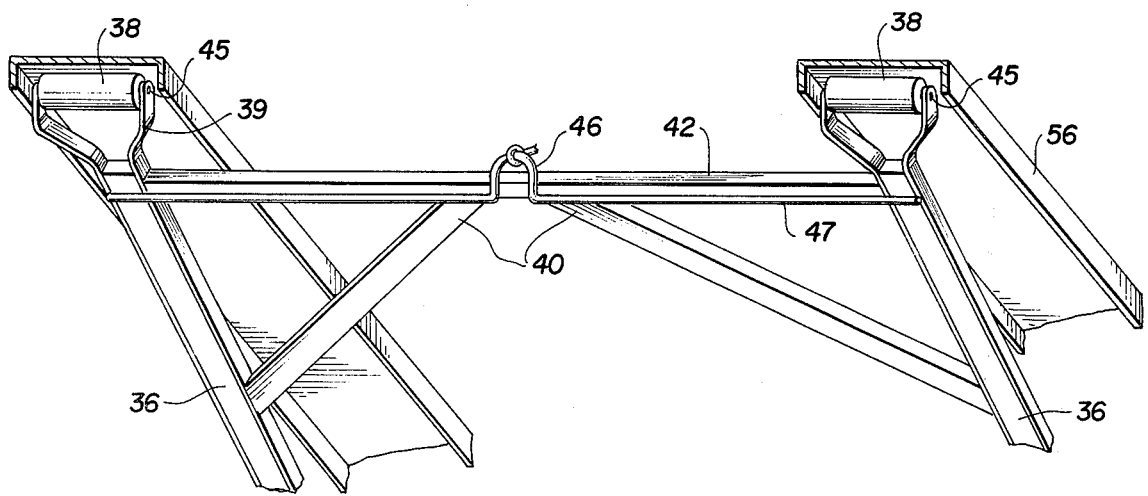
FIG. 5 is a perspective view showing cross braces, the anchor eye and cross member together with the lifting arms as they engage the inverted channel iron guide according to a practice of the preferred invention.
Figure 6:
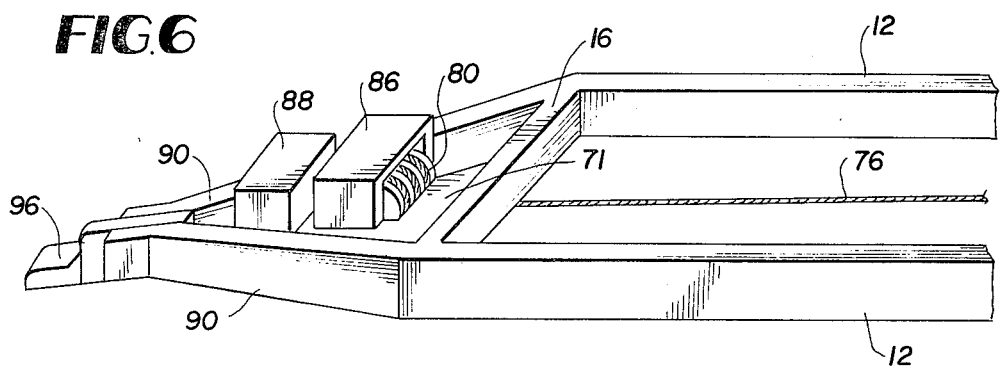
FIG. 6 is a broken away perspective view of a front end portion of the platform frame and the sloping towing arms extending to the trailer hitch arrangement and all within the purview of the present invention displaying a heavy-duty battery and electric winch for operating the winding of the cable or rope according to the preferred embodiment of the present invention.

The bed is provided with plates 31 and 31a which are welded to the linear supporting pieces 27a and equally spaced from the sides 20. A pair of inverted channel guides 56 (FIG. 5) are welded at one end to the plates 31, along its length to plate 31a, and at their opposite end to the end piece 26. The channel guides include downwardly extending sides or rails and are secured in place in parallism to provide guides for rollers supported on lifting arms 36 that aid in lifting the bed.

The cross piece or member 17 of the platform is provided on its front face with spaced supports 34 which are secured to the cross piece 17 in alignment with the guide channels 56 on the bed. Each of the spaced supports 34 are provided with aligned slots which serve as pivot points for one end of the bed lifting arms 36. The bed lifting arms 36 are provided with holes near one end that align with the slots in the spaced supports 34. The pivot is formed by a sleeve that passes through the hole in each arm and a bolt 66 is then passed through the slots in the support and through the sleeve in the hole of each lifting arm 36. The sleeve is welded in the hole in the arm and extends to each side of the arm to provide a spacing between the arm and the supports. Thus the arm will not bind on the supports. The sleeve is provided with a grease zerk (not shown) in order to grease the pivot around the bolt. The supports 34 may be fixed in place or they may be spring loaded and movable from below the platform when in a lifting condition to a raised position within the platform when in a non-lift condition. The load on the support will force the supports 34 downward against the force of the spring during lifting. If the frame is formed of solid material, the pivot could be formed with a sleeve since the pivot pin or bolt would be acting upon an opening with a solid surrounding. Appropriate spacers would be used between the frame where needed.

The supports (34) are welded vertically to the cross member (17) of the trailer with the elongated slots toward the bottom of the support. Each of the pieces of support (34) are welded separately to the cross member with the distance of 3½″ between them so the bottom end of the lifting arm (36) will fit between them and will have ½″ for play so the lifting arm (36) will not bind on the supports (34). The bolt (66) is placed through the longated hole in the support (34), then through the sleeve, then through the other longated hole. A spring is attached to this end of the bolt (66) and to the top of the channel (34) by means of a bracket with a small hole in it then welded to the channel (34a). A spring is attached to the other end of the bolt (66) and a bracket with a hole in it is welded to the top of channel (34). The opposite end of the spring (66a) is inserted through this hole in the bracket. As the tension is let off of the load line (76), the tension is let off the springs (66a) and these springs (66a) lift the bottom of the lifting arm (36) and these longated or slotted holes let the bolt (66) slide up to the top of these longated holes. The other fulcrum point on the opposite side of the trailer is fixed the same way.

The opposite end of each of the lifting arms 36 is provided with spaced arms 39 which secure a roller 38 in place. The roller is formed by a seamless steel tube which is provided with suitable pin or ball bearings 41 at each end within the roller. The bearings are spaced from each other by a spacer 43 between the bearings. The roller and bearings are supported by a bolt 45 that passes through the spaced arms from one side and extend through the bearings, the spacer and the opposite spaced arms 39. The spaced arms 39 have a spacing such that they are within the side rails of the inverted channel guide 56. The roller has a greater diameter than the width of the arms 39 and is secured in the spaced arms such that the roller is in contact with the under surface of the channel guide and the spaced arms 39 do not touch the surface of the channel guide as does the roller 38.

The lifting arms 36 are provided with appropriate cross braces 40 and a cross strut which support the lifting arms in their parallel relationship. The cross strut 42 near the roller end provides support for the lifting arms and supports a rod 47 which is welded to the strut. The rod is provided with a loop 46 along the center line of the struct and the lifting arms to which a pulley block 50 is secured by a hook 52. The rod could extend to the lifting arms and also be welded to the side of the lifting arms for additional support of the rod. The rod and strut are shown in FIG. 2. In order to keep the pulley wheels in proper alignment, suitable plates and/or spacers may be used between the pulley wheels.

The platform is mounted on a suitable structure including wheels and axels such as a utility trailer and is light enough that it can be towed by an automobile or light weight pickup truck. In order to tow the dump trailer, towing arms 90 are secured to the front end 16 of the platform so that the hitch is along the center-line of the dump trailer. The tow arms 90 slope downwardly at about 5 degrees from a line aligned with the platform and are on an angle toward the center line. The front end of the tow arms are secured to a trailer hitch 96 of any well known prior art type. The slope of the towing arms are such that the platform will be on a level when being towed by a hitch which is lower than that of the platform.

A steel plate 71 is secured to the bottom of the tow arms to provide a platform for securing en electric winch 80 which is covered by a cover 86 and mounted on the plate by any suitable bracket or other means. A battery 88 for operating the electric winch may be supported by the platform. The mounting plate 71 can be provided with a cut-out slot along the front along which a cable wound on the winch may pass.

In order to lift the bed to dump something from a body mounted on the dump bed, a block-and-tackle or pulley arrangement is used. One pulley 72 is secured to the center of the end plate 14 by use of an eye-bolt 70 that passes through the end plate 14 which is secured thereto by a nut. The pulley 72 is secured to the eye-bolt by a clevis 74 which is attached to the pulley 72. A second pulley 50 is secured by a hook 52 to the rod loop 46 on the strut 42 near the rollers 38 on the lift arms 36. The cable 76 is fed from the winch to the pulley 72 then to the pulley 50 and back around the pulley 72 and then to pulley 50 for as many loops as there are pulley wheels in each pulley. The end of the cable is secured to the pulley 72 or the end 14 after looping the different pulley wheels. Since the winch is secured between the plate 71, the cable will pass under the end plate 16 and crosspiece 17 to the pulley 72, and then from the pulley 72 to the pulley 50, the cable passes over the cross piece 17 and under the cross piece 27 in the bed. Appropriate slots could be cut in the cross pieces, if necessary, for the cable to pass without rubbing on any of the structural elements.

On assembly, the bed and platform may be formed separately. The lifting arms are secured to their pivots on the cross support 17. The winch and pulley arrangement may be made up with the cable on the winch and pulleys then the winch may be secured to the plate on the tow arm and the pulleys 72 and 50 secured to the plate on the tow arm and the pulleys 72 and 50 secured to the end plate 14 and the strut 42 respectively. The bed is then pivotably secured to the platform so that the rollers on the lifting arms are placed under the channel guides. A body can then be placed on the bed or the body could be made on the bed before placing the bed on the platform.

It is noted that the plate 30 and pivot about bolt 28 are positioned such that the sides and ends of the bed rest upon the sides and ends of the platform so that the weight of the bed, body and load are carried by the platform.

In operation, the winch is started-to roll in the cable. The cable works against the pulleys 50 and 72 to draw the strut 42 toward the end 14. Since the lift arms 36 are pivoted to the supports 34, the pivoted ends cannot be axially moved. Therefore, the roller end of the lift arms are raised. As the roller end is raised the rollers move along the channel guides 56 and raise the bed as the lift arms are raised. The side rails of the channel guides will guide the rollers along the channel guides. The lift angle of the bed may be stopped at any point between minimum and maximum range by stopping the winch.

It is noted that the adjacent rear ends of the sides of the platform and bed are cut at an angle of 45 degrees and that the plate 30 has the pivot off-center. The pivot being off center permits the bed to be raised about the platform at the pivot end during raising of the bed and the angular ends permit the sides of the bed to move directly over the sides of the platform. Thus, the end of the dump body does not extend beyond the platform during dumping. The dump angle is limited to 90 degrees because of the angle at which the ends are cut.

Additional embodiments of the invention in this specification will occur to others and therefore it is intended that the scope of the invention be limited only by the appended claims and not by the embodiment(s) described hereinabove. Accordingly, reference should be made to the following claims in determining the full scope of the invention.

What is claimed and desired to be secured by Letter Patent of the United States is:

1. A scissor tail dump trailer apparatus comprising
a platform frame for a dump trailer of generally rectangular configuration and having a rear end portion and a front end portion,
a dumping bed frame disposed to generally overlie the platform frame and being of generally rectangular configuration also hving a rear end portion and a front end portion,
a pivot plate associated with and welded onto a portion of the rear end portion of the dumping bed frame, said pivot plate positioned at each side of the rear end portion of the platform frame for pivotably mounting said bed frame thereon,
a pair of inverted channel guides disposed in parallel on one end of the dumping bed frame and having a forward end mounted to the front end of the dumping bed frame and a rear end mounted to a cross support member of the dumping bed frame,
a pair of lifting arms disposed in parallel in the interior of the platform frame having rollers mounted on a forward end for engaging respective ones of the pair of inverted channel guides and a rear end being pivotally mounted on a fulcrum frame mounted to a cross support member of the platform frame,
a strut secured between said pair of lift members near the end of which said rollers are mounted, a support rod secured to said strut, said support rod including a hook member centrally secured to said strut intermediate of the pair of lifting arms for receiving a first hook means, a first pulley block comprising a plurality of pulley wheels and said first hook disposed to engage the hook member, a second pulley block including a plurality of pulley wheels and mounted centrally of the rear end portion of the platform frame from an eye bolt, an electric winch generally centrally mounted forward and downwardly of the front end portion of the platform frame for receiving a cable means, said second pulley block having means to secure an end of a cable means which in turn passes through one wheel of the first pulley block returning to one wheel of the second pulley block thence to another wheel of the first pulley block and returning to another wheel of the second pulley block, etc. thence to the electric winch.

2. The invention of claim 1 wherein battery means is positioned adjacent to and forward of a mounting of the electric winch.

3. The invention of claim 1 wherein generally downwardly sloping towing arms extend forwardly of the front end portion of the platform frame.

4. The invention of claim 1 wherein generally downwardly sloping towing arms extend further forwardly of the front end portion terminating in a trailer hitch member.

5. The invention of claim 1 wherein the location of the electric winch below the front end portion of the platform frame allows the cable means to wind clear of a front end portion member.

6. The invention of claim 1 wherein said rear portion of said platform frame and said rear portion of said bed frame have adjacent ends cut on a slope relative to each other.

7. The invention as claimed in claim 6 wherein said pivot plate has a pivot point which is off-center of said pivot plate.

8. The invention as claimed in claim 1 wherein said pivot plate has a pivot point which is off-center of said pivot plate.

* * * * *